(12) United States Patent
Nyhart, Jr.

(10) Patent No.: US 9,696,192 B2
(45) Date of Patent: *Jul. 4, 2017

(54) IN-LINE FLOW METER

(71) Applicant: Biosynergetics, Inc., Zionsville, IN (US)

(72) Inventor: Eldon H. Nyhart, Jr., Zionsville, IN (US)

(73) Assignee: Biosynergetics, Inc., Zionsville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,002

(22) Filed: Jun. 15, 2015

(65) Prior Publication Data

US 2015/0276448 A1     Oct. 1, 2015

Related U.S. Application Data

(63) Continuation of application No. 13/352,082, filed on Jan. 17, 2012, now Pat. No. 9,057,633.

(60) Provisional application No. 61/433,408, filed on Jan. 17, 2011.

(51) Int. Cl.
  G01F 1/708 (2006.01)
  G01F 5/00 (2006.01)
(52) U.S. Cl.
  CPC .............. G01F 1/7086 (2013.01); G01F 5/00 (2013.01)

(58) Field of Classification Search
  CPC .................................................... G01F 1/7086
  See application file for complete search history.

(56) References Cited

U.S. PATENT DOCUMENTS

| | | | | |
|---|---|---|---|---|
| 2,590,830 A | * | 3/1952 | Williford | G01J 1/42 356/441 |
| 3,825,346 A | * | 7/1974 | Rizzo | G01F 1/661 356/28 |
| 3,864,044 A | * | 2/1975 | Lyshkow | G01N 21/534 250/573 |
| 4,487,075 A | * | 12/1984 | Karidis | G01P 3/40 116/264 |
| 4,788,125 A | * | 11/1988 | Davis | G03F 7/002 430/138 |
| 4,984,604 A | * | 1/1991 | Nishimura | F16L 11/12 138/125 |
| 5,153,665 A | * | 10/1992 | Weinstein | G01F 1/708 356/28 |
| 2012/0059318 A1 | * | 3/2012 | Dewey | A61M 5/16886 604/113 |

\* cited by examiner

*Primary Examiner* — Kara E. Geisel
*Assistant Examiner* — Shawn Decenzo
(74) *Attorney, Agent, or Firm* — Faegre Baker Daniels LLP

(57) ABSTRACT

A device for measuring flow is provided. Tubing having a polymer therein is activated, followed by downstream detection of agents released by the polymer. The downstream detection of the agents provides for a calculation of the flow to be performed.

20 Claims, 5 Drawing Sheets

Figure 3:
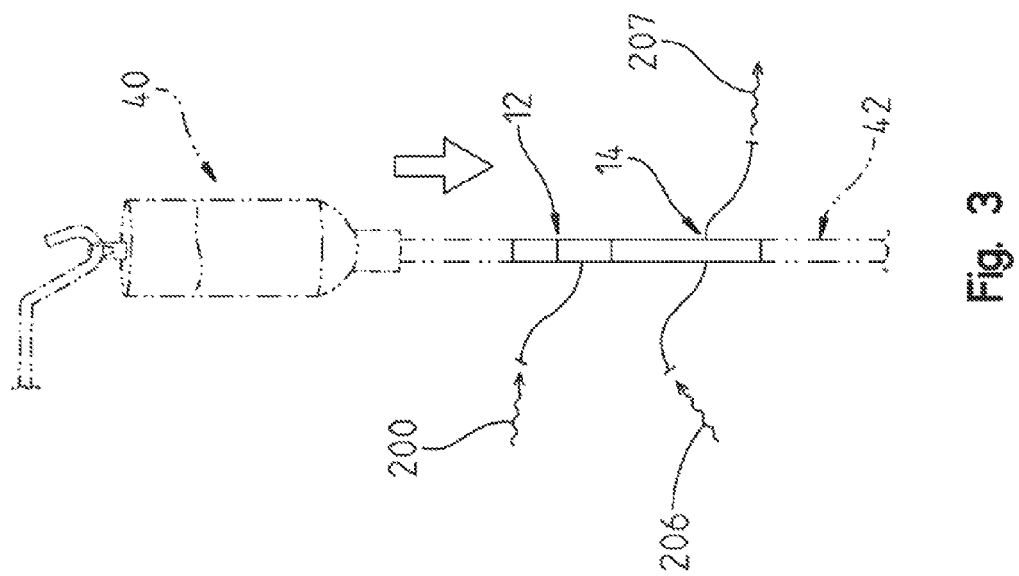
Figure 2:
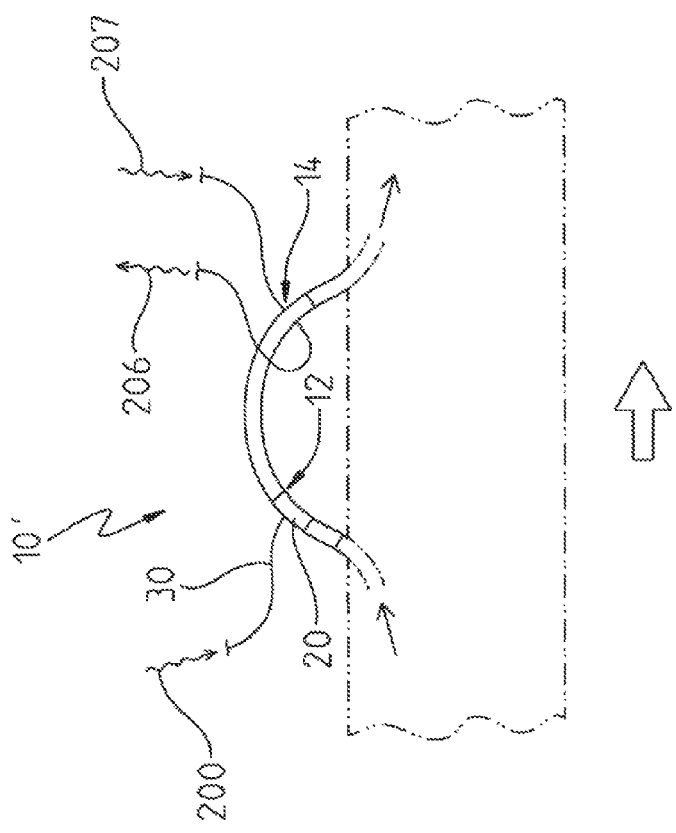
Figure 4:
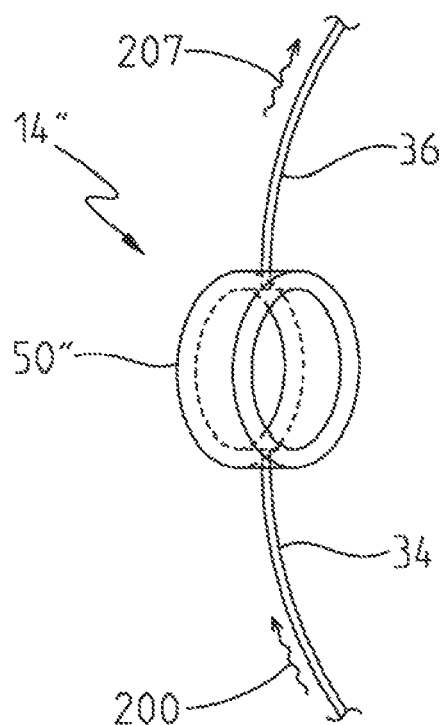
Figure 5:
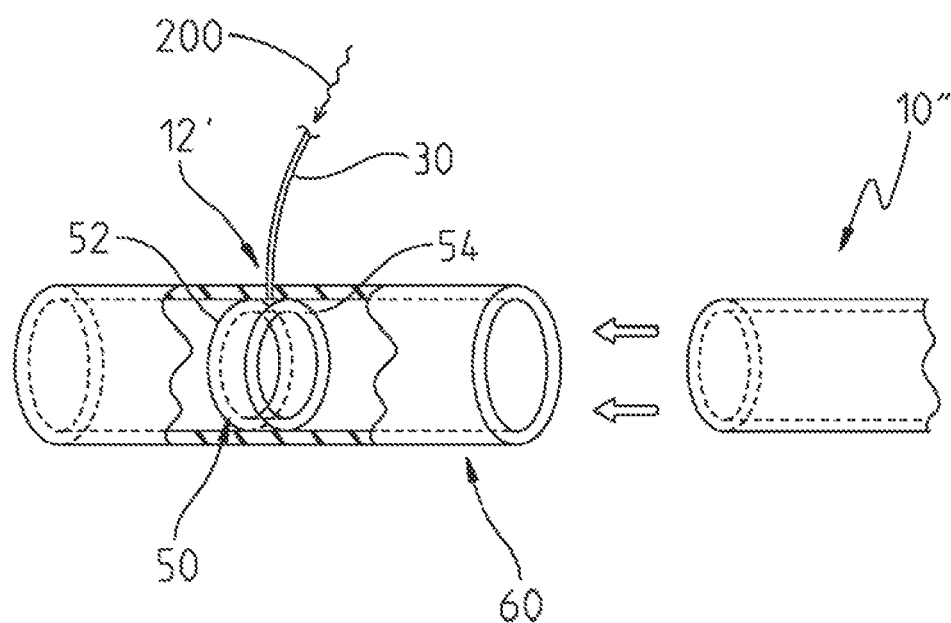

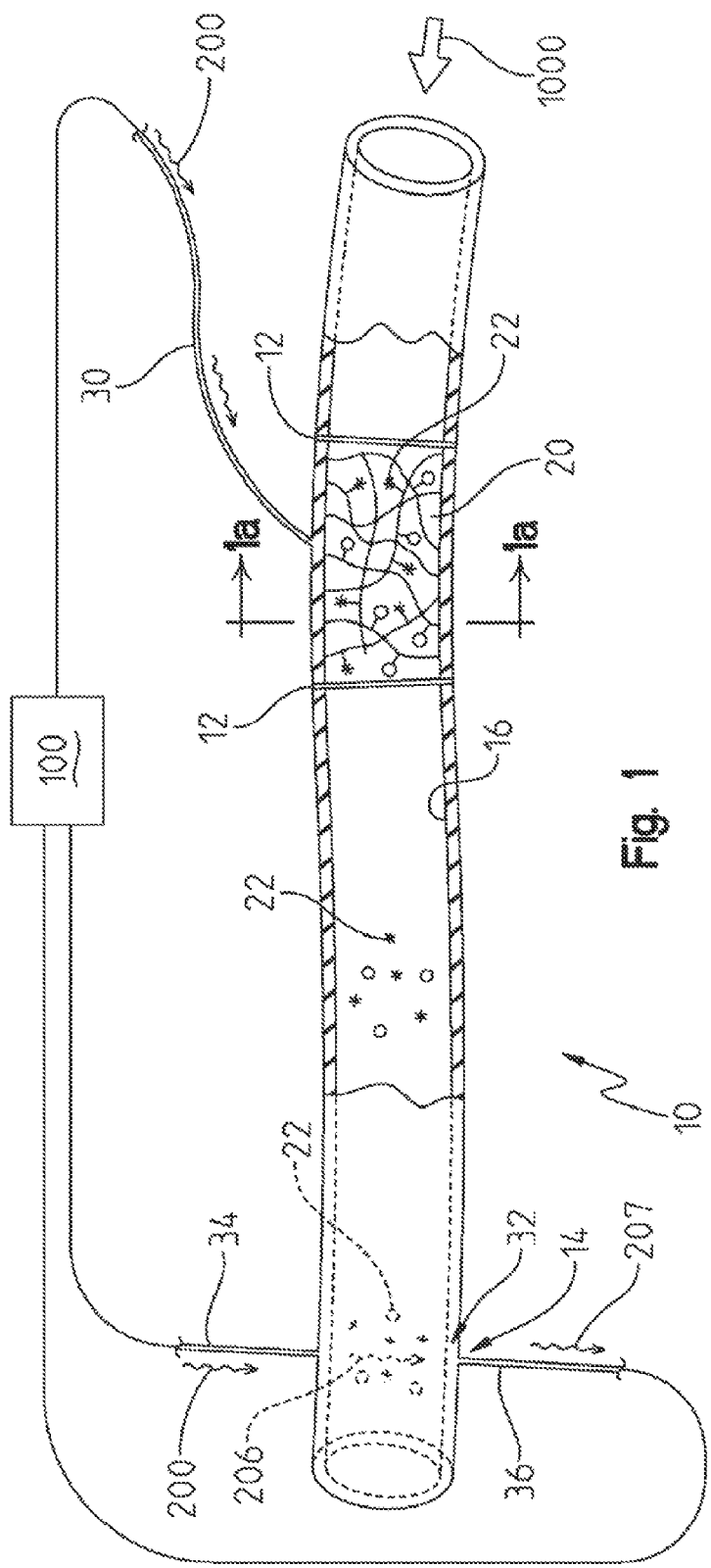
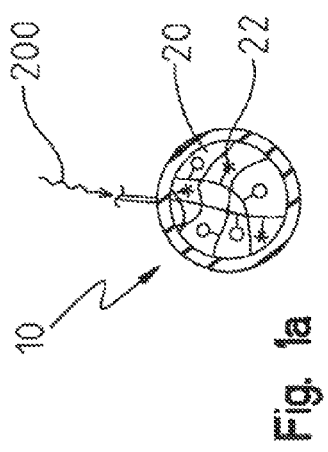
Fig. 1
Fig. 1a

IN-LINE FLOW METER

PRIORITY

The present disclosure is a continuation application that claims priority to utility application Ser. No. 13/352,082, filed Jan. 17, 2012 titled In-Line Flow Meter, which claims priority to a provisional application, Ser. No. 61/433,408, filed Jan. 17, 2011, the disclosures of which is incorporated herein by reference. The priority of both applications is hereby claimed.

BACKGROUND

1. Field of the Invention

The present disclosure relates to a device and method for measuring flow. More particularly, the present disclosure relates to a device and method for measuring flow with decreased disturbance of the flow being measured.

2. Description of the Related Art

Traditional in-line flowmeters are mechanical in nature and require reading of an indicator at the location of the installed in-line flowmeter. One such traditional flowmeter is marketed as the FL500 Series In-Line of Flowmeters by Omega Engineering.

The general operation of the traditional flowmeter provides for a flowing fluid to enter at one end of a mechanical device housing installed in the flowing fluid tubing or pipe. The flowing fluid forces a piston to move within the flowmeter apparatus against a spring. The spring is compressed relative to the pressure generated by the flowing fluid. The piston also accommodates the flowing fluid, allowing it to pass around the piston periphery and continue through the outlet of the inline flowmeter.

A portion of the piston is visible through a transparent portion of the housing. The position of the piston is viewed under a scale printed on the transparent portion. The position of the piston relative to the scale gives the fluid flow rate. Accordingly, traditional mechanical flowmeters rely on indirect pressure measurement by the spring loaded piston.

SUMMARY

The present disclosure provides a flow meter including a flow vessel having a lumen; a medium disposed in communication with the lumen, the medium holding an agent; an emission site proximate the medium and including at least one energy receiver configured to receive energy and provide for release of the agent from the medium; and a detection site spaced apart downstream from the emission site, the detection site including at least one detector providing for detection of the presence of the agent.

According to an embodiment of the present disclosure, a method of detecting a flow rate in a flow vessel is provided including providing a medium having an agent bonded thereto, the medium and agent being disposed to be in communication with a lumen of the flow vessel; flowing matter through the flow vessel; providing energy to the flow vessel to un-bond the agent from the medium such that the agent intermixes with the matter flowing in the flow vessel; and detecting presence of the agent at a known point downstream from the medium.

According to another embodiment of the present disclosure, a flow meter is provided including a sensor; a flow vessel having a lumen; an agent-infused-polymer disposed in communication with the lumen; an emission site proximate the medium and including at least one energy receiver configured to receive energy at the direction of the sensor and provide for release of the agent from the polymer; and a detection site spaced apart downstream from the emission site by a first distance, the first distance being provided to the sensor, the detection site including a light source projecting light across the lumen and at least one detector providing for detection of the presence of the agent by monitoring an amount of the projected light that is detected by the at least one detector.

BRIEF DESCRIPTION OF THE DRAWINGS

The above-mentioned and other features of the present disclosure will become more apparent and the present disclosure itself will be better understood by reference to the following description of embodiments of the present disclosure taken in conjunction with the accompanying drawings, wherein:

FIG. 1 is a partially cut-away perspective view of an integrated flow meter of the present disclosure;

FIG. 1*a* is a cross sectional view of the integrated flow meter of FIG. 1;

FIG. 2 is a side plan view of an alternative embodiment integrated flow meter;

FIG. 3 is a side plan view of an alternative embodiment integrated flow meter;

FIG. 4 is a perspective view of an embodiment of a detector;

FIG. 5 is a perspective view of the emitter of FIG. 4 installed in a cuff;

FIG. 6 is a perspective view of a part of another embodiment of a detector;

FIG. 7 is a perspective view of the detector of that includes the part shown in FIG. 6;

FIG. 8 is a chart showing an exemplary light intensity pattern detected using the flowmeter of FIG. 1.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

FIG. 1 provides an illustrative flow path in the form of tube 10. Although the flow path is illustrated and described herein as tube 10, flow paths of the present disclosure may also include other configurations. Tube 10 includes emitter location 12, and detector location 14 spaced apart from emitter location. Tube 10 is further coupled to sensor 100.

Tube 10 is illustratively constructed from clear plastic tubing. Embodiments are also envisioned where tube 10 is constructed from fiber optic tubing. Still further, embodiments are envisioned where tube 10 is constructed from a combination of clear plastic tubing (or any other suitable tubing) and fiber optic tubing. The fiber optic portion of tube 10 is provided with a desired diffraction gradient. A diffraction gradient is an expression of the amount of light that is propagated (versus lost). For example, tubing can be provided that loses 10% of its energy every inch. Thus, the amount of light present five inches away from a source is approximately 59% the amount originally provided at the source.

Emitter location 12 includes polymer 20 disposed within lumen 16 of tube 10. Polymer 20 includes an optically detectable agent 22 linked by photolabile bonds to a polymer matrix. One such polymer 20 is discussed in U.S. Patent Application Publication No. 2009/0118696 (APPARATUS AND METHODS FOR THE CONTROLLABLE MODIFICATION OF COMPOUND CONCENTRATION IN A TUBE, filed Oct. 31, 2007) which is expressly incorporated herein by reference. Emitter location 12 further includes energy pathway 30. In the present example, polymer 20 is disposed within tube 10 to provide at least one lumen for fluid flow through polymer 20. Additional embodiments are envisioned where the lumen within polymer is of an equal size to lumen 16 and polymer 20 is provided in a portion of increased diameter. Still other embodiments are envisioned where polymer 20 is not within lumen 16, but rather sits outside tube 10 but that is still able to allow transfer of agents 22 into lumen 16.

In one embodiment, polymer 20 is a hydrogel, and detectable agents 22 are photolabily-linked to the molecules of the hydrogel. The photolabile linkages between agents 22 and the hydrogel are illustratively broken by exposing the photolabile bond with the proper wavelength of radiation to break the photolabile bond. In one embodiment, the source of radiation is a laser tuned to a band of wavelengths that is sufficient to break the photolabile links. However, the present invention also incorporates those embodiments in which the source of radiation includes lasers operating over wide ranges of wavelengths and also incoherent light.

Detector location 14 includes detector 32. As shown in FIG. 1, detector 32 includes energy supply pathway 34 and energy return pathway 36. Pathways 34, 36 are positioned such that energy supplied by pathway 34 can, at least partially, be received and transmitted by pathway 36.

Pathways 30, 34, 36 are coupled to sensor 100. Pathways 30, 34, 36 are illustratively fiber optic strands. Illustratively, pathways 30, 34, 36 are end-glow fiber optic strands.

Sensor/controller 100 includes modules that are able to convert electric signals to optical signals used in pathways 30, 34, 36. Sensor 100 is shown as an integrated member to which pathways 30, 34, 36 directly connect. However, it should be appreciated that embodiments are envisioned where the modules are distinct from sensor 100 such that there are electronic leads between sensor 100 and the modules for communication therebetween. Sensor 100 includes electronic storage that knows various physical characteristics of the setup of tube 10, emitter locations 12, and detector location 14.

In use, tube 10 contains a flowing fluid, such as a liquid or a gas and can also be a flow of solid particulate matter such as an aerosol or solid microparticles. The fluid flows within tube 10 and through polymer 20 along direction 1000. According to a programmed setting or manual engagement, sensor 100 emits a signal that causes energy to be conducted along pathway 30.

The emitted energy travels along pathway 30 and is then emitted in tube 10 at emitter 12 such that polymer 20 is exposed thereto. As described in more detail in U.S. Patent Application Publication No. 2009/0118696, exposure of the provided energy on polymer 20 causes release of agents 22. In the illustrated embodiment, the emitted energy is a pulse of light, such as that generated by a laser of a prescribed frequency.

Agents 22 are thereby released from bonds holding them in place. The release forms a bolus of agents 22. The size of the bolus of agents 22 is determined by the intensity of light provided at emitter location 12 and the diffraction gradient of tube 10. Initially, polymer 20 is full of agents 22. Accordingly, the intensity of the provided light is chosen such that the agents 22 within the first inch (or other desired length) will receive light having enough energy to break the photolabile bonds. Accordingly, agents 22 within the first inch will be released while agents 22 beyond the first inch will not be subjected to enough energy to break the bonds. A subsequent desired activation of the system will require increased light intensity such that, given the diffraction gradient, light will reach another section of polymer having agents 22 therein for release. In the provided example shown in FIG. 1, emitter locations 12 are provided at each end of the section of polymer 20. Thus, at the point that half the agents 22 are released, a second emitter location can be used instead, thereby reducing the amount of energy needed to achieve release. It should also be appreciated that this discrete sectioning of where agents 22 are being released from also allows increased specificity with respect to the distance that agents 22 must travel to reach detector location 14.

The release frees the bolus of agents 22 to be subjected to the forces presented by the fluid flowing in tube 10. Such forces carry agents 22 in direction 1000. Eventually, the flow causes agents 22 to arrive at detector location 14.

As previously noted, detector location 14 has pathways 34, 36. Pathway 34 delivers sensor light 200 to the outer tubing surface. This light 200 then proceeds through the tubing body through a clear portion of the tubing wall. Light 200 then enters the tubing lumen and provides a beam of light 206 which traverses the diameter of the tubing lumen, where flowing fluid exists, reaching the opposite side of the lumen. The exiting light 207 passes out of the tubing in a similar fashion as it entered on the opposite side of the tubing and is carried away through pathway 36. Both light entering the detector location 14 as light 200, and light exiting the detector location 14 as light 207 can easily be carried long distances from commonly available light energy sources, or to suitable commonly available light detectors for processing.

The laser light 200 has a base transference property that defines an amount of light expected to traverse tube 10 and the fluid and be received by pathway 36. The arrival of agents 22 provide that the amount of light received by pathway 36 is reduced.

A characteristic of agent 22 is that it can absorb and/or deflect light 200 supplied through the wall of tube 10. When the bolus of agent 22 passes through the beam 206, a portion of the light 200 will be absorbed/deflected before the remaining light exits as light 207. Light 207 can travel a substantial distance so that its intensity can be determined using standard light detectors.

Figure 8:
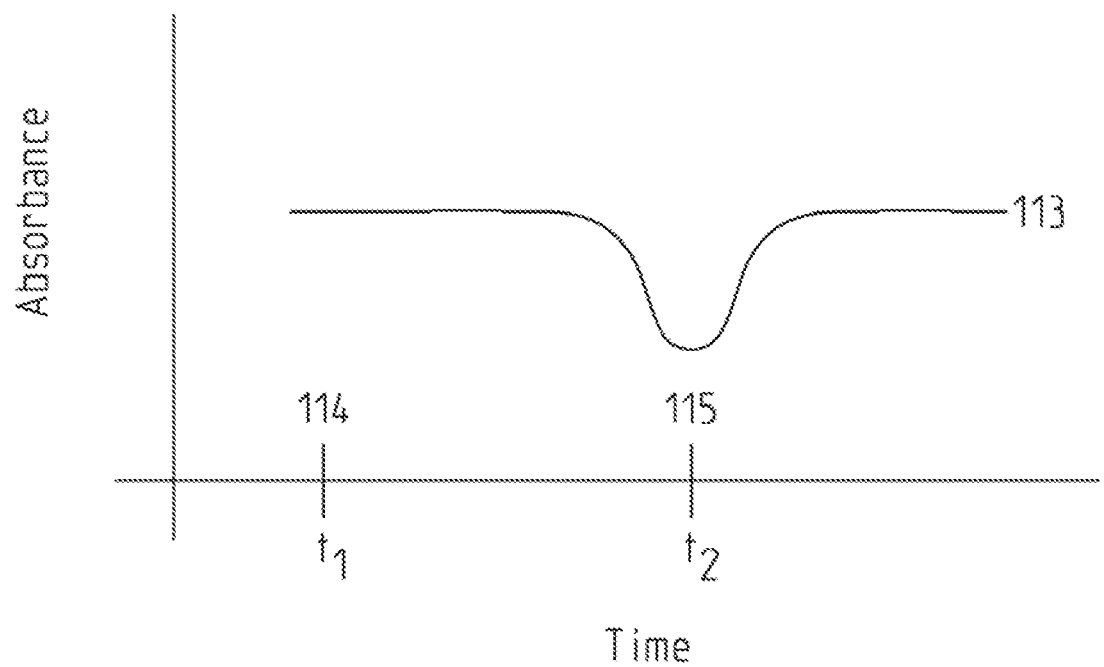

FIG. 8 represents the intensity 113 of light 207 over time. Time t1 (114) represents the time when the bolus of light is provided to emitter location 12, thereby releasing a portion of agent 22. Time t2 (115) represents the time when the bolus of agent 22 passes through the beam at detector location 14. At time 115 the intensity 113 measurement of light 207 decreases due to light absorbance/deflection of agents 22.

Sensor 100 knows when energy was emitted along pathway 30, knows the amount of light expected to traverse tube 10 in the absence of agents 22 in the fluid, and detects the amount of light traversing tube 10 when agents 22 are present in the fluid. Sensor 100 detects agents 22 as they pass through detector location 14 using photonic absorbance/deflection differences. Sensor 100 further knows the distance between emitter location 12 and detector location 14.

Accordingly, the absorbance/deflection difference allows sensor 100 to determine the time between release t1 and arrival t2 of agents 22. By also knowing the distance between emitter location 12 and detector location 14 as well as by knowing other factors that impact flow of agents 22, a flow rate of the fluid within tube 10 can be determined.

Figure 6:
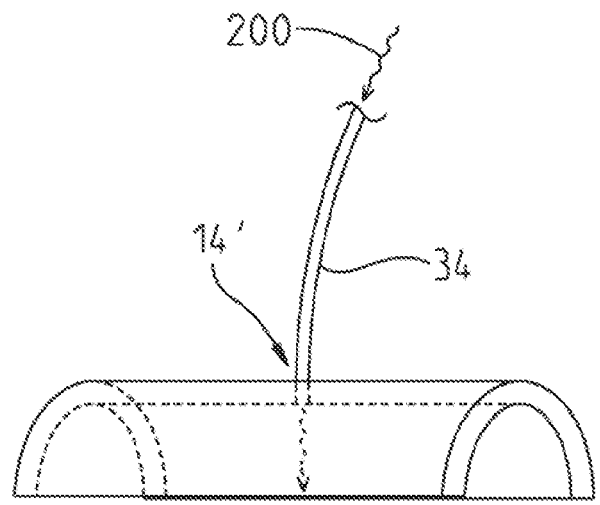
Figure 7:
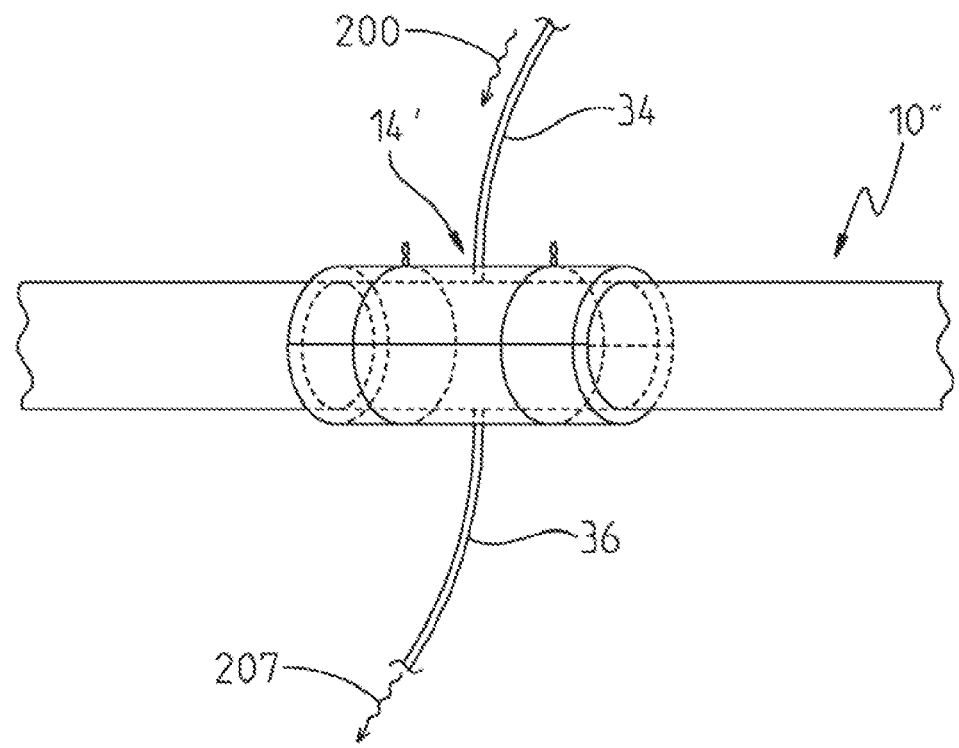

Agents 22 can be considered in solution with a portion of fluid immediately surrounding polymer 20 after release at location 12. Polymer 20 is also in contact with the convective flowing fluid material. It is anticipated that free agents 22 in solution may take some time to fully merge with the convective fluid flow. If significant, this finite time-lag, t0, can be quantified from calibration measurements for various flowrates.

The linear distance along the tube or pipe between locations 12, 14 can be obtained/supplied as d1. The rate of the flowing fluid (length/time) can be calculated directly using the formula d1/(t2−(t0+t1)).

This type of flowmeter develops almost no resistance to fluid flow, thereby not affecting pressure gradients on either side of the new in-line flowmeter. Possible disturbance of the flowing fluids can result in increased turbulence as fluid passes through the traditional flowmeter thereby creating increased shearing energies within the fluid which may contribute to degradation of fluid characteristics sensitive to shear stresses.

The in-line flowmeter of the present disclosure also is linear in its operation and performs equally well at both relatively fast and slow flowrates. A mechanical in-line flowmeter is potentially limited by nonlinear spring action responses, thus potentially being insensitive to very slow and very fast flowrates. Additionally, the mechanical nature can wear out and change over time, while the new in-line flowmeter remains constant in its operation, as long as agent 22 is present. Mechanical flowmeters can cause increasing head pressure, or pressure on the inlet side as compared to the outlet side. These pressure differentials are additive so that multiple mechanical flowmeters placed in-line create greater differences in pressure when comparing the inlet pressure to the final exit pressure. In a large plant this can be a major factor in process control.

It should also be appreciated that there are no electrical components directly associated with the new in-line flowmeter. For remote sensing of the traditional in-line flowmeter electromechanical mechanisms are required, adding to the complexity, susceptibility to failure, and cost of remote sensing. Local sensing of the mechanical flowmeter is available by observing a window, either personally or possibly remotely by camera.

The advantages of not disturbing the flowing fluid mechanically can be exploited for fluids susceptible to clogging or shearing stresses, or very fast or very slow (iv infusions) flowrates. FIG. 3 shows one such implementation. FIG. 3 shows iv bag 40 with output tubing 42. Output tubing 42 is provided with emitter location 12 and detector location 14. As described above, a flow rate within tubing 42 can thus be assessed.

The advantages of measuring flowrate with no mechanical mechanisms and no electromechanical elements allows measuring flowrates of explosive or volatile fluids (airplane/automobile fuel control and delivery). This allows for safer handling of fuel transport and handling relative to the traditional flowrate measuring. It should be appreciated that agent 22 is chosen such that its presence has minimal or no effect upon the purpose of the fluid (such as in fuel delivery, agent 22 is chosen such that it does not have a detrimental effect upon the fuel's ability to be used in an engine and so as to not leave undesired residues).

Additionally, the in-line flowmeter of the present disclosure provides no moving parts, thereby reducing failure points. Operation of the flowmeter also allows that very high and very low flow rates can be detected. Traditional flow meters often have to pick which of high and low flow rates they aim to accurately measure.

It should be appreciated that operation of flow meter tubing 10 relies on degradation/alteration of polymer 20 to release agent 22. Accordingly, each activation of emitter location 12 uses some of the discrete and finite amount of agent 22 present within polymer 20. Accordingly, while this presents little problem in instances where tube 10 is intended to be disposable, such as tubing 42, more permanent and long standing implementations may benefit from the ability to replenish agent 22 and polymer 20.

FIG. 2 shows an embodiment that provides for easy replenishment of agent 22 and polymer 20. Tube 10', rather than being the primary fluid pathway, is provided as an auxiliary pathway. If agent 22 is depleted, emitter location 12 can be clipped out, or otherwise removed, and replaced by a new emitter location 12 with a new supply of polymer 20 and agent 22. Embodiments are envisioned where polymer 20 and agents 22 are provided as part of removable cartridges that are readily removable and replaceable. Spent cartridges or sections can then be "recharged" by introducing additional agents 22 and photolabily bonding agents 22 to polymer 20.

In addition to depletion of agents 22, the release response of polymer 20 can be affected by the distance that polymer 20 is located from the exact spot that energy is applied to tube 10. As noted, release of agents 22 is dependent upon provided energy coming into contact with the photolabile bonds with agents 22. The most likely bonds to interface with energy are those closest to the interface of pathway 30 with tube 10. Accordingly, agents 22 closest to pathway 30 are most likely to be broken. As more agent 22 is released, the location of the majority of viable agent 22 still available to be released becomes located farther from entry emitter disc pathway 30. Additionally, transmittance of energy along pathway 30 and tube 10 may degrade with increased distance (via the set diffraction gradient). Accordingly, it is envisioned that energy is supplied with increased intensity or magnitude to offset any expected losses. Accordingly, any expected reduction in response by polymer 20 due to distance can be offset by increased energy supply.

FIG. 4 shows another embodiment detector location 14". Detector location 14" provides energy pathways 34, 36 that interface with ring 50" to act as a detector. Ring 50" can be located within a butt joint housing similarly to that discussed below (see butt joint housing 60 of FIG. 5).

FIG. 5 shows another embodiment emitter location 12'. Emitter location 12' provides energy pathway 30 that interfaces with ring 50 of "side-glow" fiber optic material. The light emission profile of ring 50 can be customized as desired by applying opaque coatings to surfaces where light emission is not desired. Accordingly, in the provided example, energy supplied to ring 50 is emitted therefrom along side 54. Ring 50 is disposed within butt jointhousing 60. Butt joint housing 60 is provided with an interior diameter substantially equal to the outer diameter of ring 50. Ring 50 is sized such that its outer diameter is substantially equal to the outer diameter of tubing 10". Tubing 10" is fiber optic tubing sized to be received within butt jointhousing 60. As shown in FIG. 5, tubing 10" is received within butt jointhousing 60 to abut ring 50 and create a fluid seal therebetween. Tubing 10" has polymer 20 disposed therein. Accordingly, energy supplied to ring 50 is supplied to tubing 10" and propagated thereby. The energy eventually encounters polymer 20 to cause release of agent 22.

FIG. 6 shows one half of another embodiment detector location 14'. Detector location 14' is attachable to tubing 10, 10', 10" downstream of the location of polymer 20. (Additionally, the half shown in FIG. 6 could also be used as another embodiment emitter location 12.) Both halves of detector location 14' are shown in FIG. 7. Other embodiments are envisioned where the halves of detector location 14' are not separate but otherwise provide for selective application to tubing 10, 10', 10". Detector location 14' is attachable to allow placement on otherwise standard tubing. It should be appreciated that the variable placement of detector location 14' requires that such placement be communicated or input to sensor 100. Detector location 14' operates like detector location 14 by providing energy and capturing energy that is able to traverse tubing 10, 10', 10" and fluid therein.

Embodiments are also envisioned where patterns in the signal of exiting light 207 are analyzed by sensor 100. Such signal analysis can then provide flow characteristics such as turbidity, viscosity, and turbulence. Additionally, embodiments are envisioned where more than one sensor is installed downstream to be able to determine wave front characterization and added accuracy.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A flow meter including:
   a flow vessel having a lumen;
   a medium fixed in the lumen, the medium holding an agent fixed in the lumen;
   an emission site proximate the medium and including at least one energy receiver configured to receive energy and provide for release of the agent from the medium responsive to receiving the energy;
   a detection site spaced apart downstream from the emission site, the detection site including at least one detector providing for detection of the presence of the agent; and
   a sensor coupled to the detector, the sensor operable to determine flow velocity within the lumen responsive to detection of the presence of the agent at the detection site.

2. The meter of claim 1, wherein the medium is a polymer.

3. The meter of claim 2, wherein the polymer is bonded to the agent via photolabile bonds.

4. The meter of claim 1, wherein the agent performs at least one of absorbing light and scattering light.

5. The meter of claim 1, wherein the energy is light energy.

6. The meter of claim 1, wherein the sensor receives an indication of when energy is received at the emission site and the sensor receives an indication of when agent is present at the detection site.

7. The meter of claim 6, wherein the sensor includes software to analyze the indication of when agent is present at the detection site to perform pattern recognition and determine at least one of turbidity, viscosity, and turbulence of a measured flow.

8. The meter of claim 1, wherein the detector includes a light source and a light detector, the detector providing detection of transmittance of light from the light source.

9. The meter of claim 1, wherein the energy is not electrical.

10. The meter of claim 1, wherein the flow vessel is devoid from moving parts, excepting that the agent may move once released from the medium.

11. The meter of claim 1, wherein the energy is received in the lumen.

12. A method of detecting a flow rate in a flow vessel including:
    providing a medium having an agent bonded thereto, the medium and agent being disposed to be in communication with a lumen of the flow vessel;
    flowing matter through the flow vessel;
    providing energy to the flow vessel to un-bond the agent from the medium such that the agent intermixes with the matter flowing in the flow vessel;
    detecting presence of the agent at a known point downstream from the medium; and
    determining the flow rate of the matter within the flow vessel based on the detection of the presence of the agent at the known point.

13. The method of claim 12, wherein the agent is photolabily bonded to a polymer coupled to the flow vessel.

14. The method of claim 12, wherein providing a medium includes providing a polymer.

15. The method of claim 14, wherein the polymer is bonded to the agent via photolabile bonds.

16. The method of claim 12, wherein the energy is light energy.

17. The method of claim 12, further including providing a sensor, receiving an indication of when energy is received at the emission site, and receiving an indication of when agent is present at the known point.

18. A flow meter including:
    a sensor;
    a flow vessel having a lumen;
    an agent-infused-polymer disposed in communication with the lumen;
    an emission site proximate the agent-infused-polymer and including at least one energy receiver configured to receive energy at the direction of the sensor and provide for release of the agent from the polymer; and
    a detection site spaced apart downstream from the emission site by a first distance, the first distance being provided to the sensor, the detection site including a light source projecting light across the lumen and at least one detector providing for detection of the presence of the agent by monitoring an amount of the projected light that is detected by the at least one detector, the sensor operable to determine flow velocity within the lumen responsive to detection of the presence of the agent at the detection site.

19. The meter of claim 18, wherein the emission site includes fiber optic tubing with a defined diffraction gradient that, along with an intensity of provided energy, determines an amount of agent released into the lumen.

20. The meter of claim 18, wherein the polymer and agent of the agent-infused-polymer are bonded together via photolabile bonds.

* * * * *